Oct. 1, 1957

W. H. COLBERT ET AL 2,808,351

ELECTRICALLY CONDUCTING COATED GLASS OR CERAMIC
ARTICLES SUITABLE FOR USE AS A LENS, A
WINDOW OR A WINDSHIELD, OR THE LIKE

Filed Oct. 31, 1952

Inventors
William H. Colbert
and Willard L. Morgan
By Nobbe & Swope
Attorneys

Oct. 1, 1957
W. H. COLBERT ET AL
2,808,351
ELECTRICALLY CONDUCTING COATED GLASS OR CERAMIC
ARTICLES SUITABLE FOR USE AS A LENS, A
WINDOW OR A WINDSHIELD, OR THE LIKE
Filed Oct. 31, 1952
2 Sheets-Sheet 2
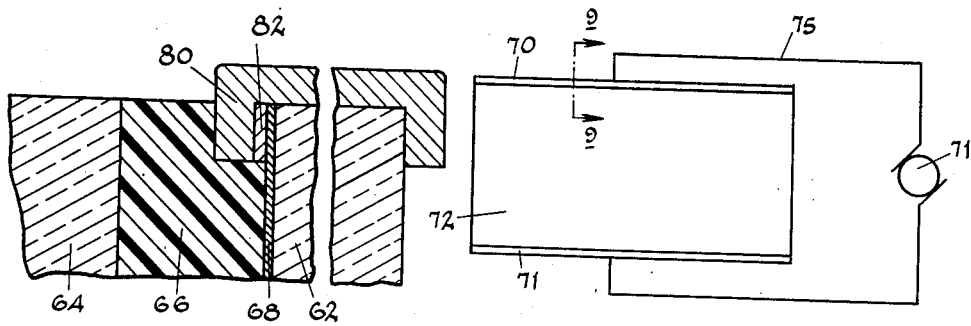
Fig. 9
Fig. 8
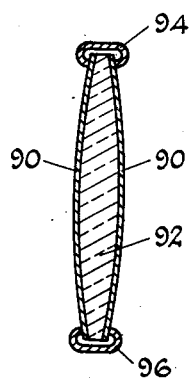
Fig. 10
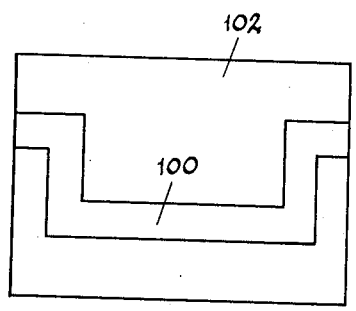
Fig. 11
Inventors
William H. Colbert
and Willard L. Morgan
By Nobbe & Swope
Attorneys

United States Patent Office 2,808,351
Patented Oct. 1, 1957

2,808,351

ELECTRICALLY CONDUCTING COATED GLASS OR CERAMIC ARTICLES SUITABLE FOR USE AS A LENS, A WINDOW OR A WINDSHIELD, OR THE LIKE

William H. Colbert and Willard L. Morgan, Pittsburgh, Pa., assignors to Libbey-Owens-Ford Glass Company, Toledo, Ohio, a corporation of Ohio Application October 31, 1952, Serial No. 318,058

23 Claims. (Cl. 117—211)

The present invention relates to electrically conducting coated glass or ceramic articles suitable for many uses, including light transmissive electrically conducting optical articles such as a lens, a window or a windshield, or the like, which are unique in that they are coated with a highly transparent electrically conducting coating, and including other articles of transparent or substantially non-transparent nature such as space heaters, electrical resistances and conductors, static dissipators, light transparent radio frequency shields, and flat conductors useful for producing electrical fields.

The articles comprise a body of glass or other ceramic material of siliceous nature which may be transparent or opaque in which a continuous layer is formed upon such body by depositing thereon by molecular deposition within a vacuum by thermal evaporation an intimate molecular mixture of a metal and of an oxide of silicon such as silica or silicon monoxide, and as a layer which is substantially uniform in thickness and the proportion of metal to the solid silicon oxide in such layer and the thickness of said layer are such that said layer is electrically conductive. By such a construction it has been found that not only are products produced which are strongly adherent and durable, but they are of a maximum light transmission when so desired and of a very high degree of electrical conductivity when even very thin films of the intimate mixture of metal and a di-electric compound are thus used.

The application of products having both electrical properties and light transmissive or other optical properties such as reflection or specific opacity to electrical waves or various parts of the visible spectrum calls for a careful designing of the products to each particular problem. More important, since most electrical problems involve the specific requirements of certain energy flows at very specific voltage or current requirements, the products generally have to be built to a specific or limited range of electrical conductivity or electrical resistance as defined by overall ohms resistance for a certain length, or more particularly, by the factor of ohms per unit of square area in dealing with the flat areas such as in many of the products herein described.

It is one of the advantages of the present invention that products of an extremely wide range of electrical properties varying in electrical resistance from a few ohms per square up to a value approaching the conductivity of uncoated glass (approximately 1200 megohms) may be readily prepared as stable articles in which the value of resistance may be controlled with great accuracy.

Thus, in the production of static dissipating coatings, such as those suitable for instrument faces or transparent work table tops, it is merely desirable that these be capable of carrying relatively small currents of a few milliamperes only and the electrical resistance may generally be of most any value. On the other hand, if such a static dissipating coating is to be employed upon a window or airplane canopy, it is generally desirable that such window be also transparent both to light and to radio frequency signals and in such cases the electrical conductivity should be held well above 50,000 ohms per square. Conversely, it is apparent that for shielding radio frequency such as may be generated in an ordinary fluorescent lighting tube it is desirable to have a highly light transparent electrically conducting coating which is also very highly conductive for electricity and in this case it would be desirable that the coating be of less resistance than 1,000 ohms per square.

The present invention also relates particularly to the production of novel type of windshield or window, or other transparent optical articles such as a lens or goggle which may be electrically heated by passage of current through the electrically conducting transparent coating deposited thereon. In such articles, and also in the case of space heaters such as may be employed in walls of buildings as overall heat radiators which of course need not be transparent, there are very high requirements for electrical conduction and in these cases it is highly desirable that the electrical resistances be lower than 200 ohms per square and as low as a few ohms per square. However, in these cases, as well as in the forming of flat or contoured glass or ceramic bodies, having electrically conductive coatings thereon employed for the purposes of setting up electrical fields, a specific electrical conduction or electrical resistance value is generally desired dependent upon the voltages available in such installations and the actual current flows desired.

Attempts to prepare electrically conducting articles, and particularly transparent electrically conducting articles, by deposition, by thermal evaporation in a vacuum, or by sputtering have not been successful where it has been desired to have a product of over 5,000 ohms per square since in order to secure such high resistances the metal coatings had to be of only a few molecules thickness and the inventors have found that when such coatings of less than 100 Angstrom units or 25 molecules thickness were prepared, that it was impossible to secure duplicable results and that the values of electrical resistance secured were extremely high and extremely variable. Such products also lacked generally any hardness or resistance to wiping off from the siliceous or glass surfaces since the metals employed did not stick directly to such surfaces. Where it was desired to produce products of relatively high conductivity or lower ohms resistance than the 5,000 ohms per square figure given, it was found that again, the failure of the metal to stick to the siliceous surfaces prevented a production of reproducible products and led to extremely erratic results in electrical conductivity and also in light transmission.

In our prior copending application Serial No. 88,208, now Patent No. 2,628,927, the inventors have disclosed one means of preparing electrically conductive articles particularly of a transparent nature in which the desired adhesion and resultant durability were secured by depositing first upon the siliceous surfaces a uniform continuous coating of a metallic inorganic compound such as a metal oxide, metal sulfide, or metal halide. Upon such coating there was then deposited a metal layer and when the metals were deposited upon such metallic compound surfaces they were found to give continuous uniform metal layers which were highly adherent to the metal compound and in turn to the glass or siliceous surfaces. By the use of such metal compound layers upon the siliceous surfaces it was found possible to deposit metal coatings which were extremely thin but which were continuous and uniform in nature in contrast to the erratic results resulting from direct deposition upon the uncoated siliceous surfaces where these continuous coatings were secured.

In the present invention there is formed a continuous layer which consists of an intimate molecular mixture of a metal and of the solid oxides of silicon such as silicon monoxide or silicon dioxide, the latter being better known as silica. In some cases this layer may be deposited directly upon the surface of a support body or in some cases it may appear as an intermediate layer in a composite structure. The silicon oxide provides adhesion between the mixed composition layer and the siliceous support and also provides adhesion to the metal which is molecularly mixed throughout with the silicon oxide. For such composition it is found that the products are strongly adhered to the supports and are durable and hard, and that as the metal atoms are deposited in the intimate molecular mixture with the di-electric silicon oxide, they are not free to move and are located in such mixture in accordance with the manner in which they are laid down by the molecular deposition method of thermal evaporation within a vacuum.

It would be expected that when a metal which is in itself electrically conducting and when solid oxides of silicon which are di-electric materials which are non-electrically conducting, are deposited as a mixture that the non-electrically conducting di-electric would cause the product to be non-electrically conducting. It has been found however, that when such a mixture is formed in which the mixture is an intimate molecular mixture where the materials are essentially present in molecular condition that there is considerably more electrical conductivity than might be otherwise expected and it is presumed that there must be some method of conduction across the extremely small insulating spaces provided by the separating of the metal molecules from each other by the insulating but very small di-electric molecules.

While the conductivity secured from a given amount of metal when mixed in such intimate molecular mixture with a di-electric silicon oxide material is not as large as it would be if the metal were present as a continuous solid metal layer, this results in providing one of the advantages of the present invention. For certain higher resistance films consisting of pure metal the thickness of the films was necessarily very low, such for example as less than 100 Angstrom units, or in some cases less than 20 Angstrom units. It is an advantage in the present method that much more material is required to secure a given degree of electrical conductivity and the films are thereby thicker and thereby more durable and wear resistant. Thus, it is possible to prepare for the first time stable high resistant coatings in which a small amount of metal is dispersed in a relatively large amount of di-electric silicon oxide and thereby a fairly good thickness of hard durable nature may be employed. Thus, attempts to prepare high voltage static dissipators in the past by the use of coatings of metal of less than 20 Angstrom units or greater thicknesses were generally highly unsuccessful due to erratic values, unstable electrical character, and lack of resistance to rubbing of such extremely thin films. The method provides also the further advantage that metals subject to air oxidation or corrosion such as aluminum or silver, can be readily employed in that embedding such metal atoms in the di-electric results protecting them from change under ordinary atmospheric conditions.

It is apparent that the embedding provides coatings which are of improved hardness as compared with those secured where the relatively soft metals such as gold or aluminum are used as separate layers. It is also apparent that with the metals molecularly dispersed with the di-electric that the metal atoms are fixed in definite position and are not free to diffuse around so that the products show immediate stable electrical values which do not change in storage nor readily change when the products are heated.

A further advantage coming from the present method and residing in the product produced is found in that by being able to incorporate the metal conductor into the di-electric as one layer it becomes possible to eliminate one interface which would be present if a continuous solid metal conducting layer was employed in the structure. It is thus possible to build electrically conducting light interference operating coatings without a separate discrete metal conducting layer which would introduce optical problems at its own interfaces. Thus, the present method permits constructing optical light interference filters and mirrors or dichroic mirrors or filters of a simplified construction.

The present invention may employ a continuous electrically conducting layer which consists of an intimate molecular mixture of a metal and di-electric silicon oxide in which the proportion of the metal and di-electric are substantially uniform throughout the layer. It may on the other hand employ such a continuous electrically conducting layer in which the proportion of metal and di-electric varies continuously throughout its depth in actual ratio of the two or more materials.

The invention also comprises the use of such a continuously varying blended mix layer in which at one interface of such layer it is in contact with substantially pure metal and the layer changes from thereon by an increasing amount of di-electric up to the point where at the other interface the composition becomes practically pure di-electric. The invention also conceives the use of such a graded layer which is electrically conducting in itself as an intermediate layer which also operates to adhere an electrically conducting layer of pure metal either directly to the siliceous support or to a preceding coating, and also such mixed layers, that will serve as adhering layers between an underlying electrically conducting layer and adhere it to an overlying protective layer such as one of silica. In such constructions the mixed metal and di-electric layers operate not only from an adhesion functioning but from an optically functioning and from an electrically conducting functioning also in addition to that of the pure metal layer. Thus, it will be apparent that such a mixed di-electric silicon oxide and metal layer, while primarily functioning as an adhesion layer to adhere a pure metal layer to some other film or support, will be in itself electrically conducting and will further provide the interesting optical feature that where it is graded from pure di-electric in contact with the surface to which adhesion is to be secured, through a graded composition to a place where it is in contact with pure metal and is substantially pure metal, then the optical result is secured that an optical face between such graded mixed electrically conducting layer and the pure metal layer is avoided. Similarly, it is possible by the present method to also avoid an optical interface between a pure di-electric coating and the mixed electrically conducting layer where such is graded from pure di-electric in the mixture in contact with the pure di-electric film and by grading through an increasing amount of metal into contact with the pure metal, both optical interfaces may be avoided.

It will be apparent that depending upon the relative amounts of metal and di-electric silicon oxide employed and the volumetric ratios between atoms of such materials, that the electrically conducting layers may in some instances have metal atoms which are surrounded substantially by di-electric atoms and in other cases may have di-electric atoms substantially surrounded by metal atoms and it is apparent that both such instances may occur within any particular film regardless of a relative volumetric composition. Thus, at best, the conduction would seem to be through small chains of a few metal atoms in contact and across insulating spaces where the di-electric breaks such possible direct contacting metal atoms. At any event it is apparent that the conductivity through such a film must be by some torturous path and that the resistance to be secured would normally be higher for a given amount of metal than would occur if the same amount of metal was present in a uniform continuous solid film by itself. Thus, it also is apparent that in order to secure a desired amount of conductivity more metal must be employed than would be the case where two separate layers were employed, one of which was a metal compound and one of which was metal, as in our prior copending application Serial No. 88,208. This greater thickness of metal and consequent carrying amount of di-electric results in the conducting layers in the products being thicker than those secured in the preceding invention. By this invention we cannot only prepare transparent electrically conducting articles as disclosed in our prior application but the present invention permits the forming of articles of any desired transparency or opacity and of any desired electrical conductivity.

It will be obvious that in forming an electrically conducting article in which the electrical conducting film is so extremely thin, it becomes very necessary that the coating be uniform in thickness as otherwise slight variations in thickness will result in variable electrical conductivity over the surface and development of greater heating at points of minimum thickness. Such development of hot spots may lead to burning out of such a film. In order to secure the necessary smooth continuous and uniformly thick conducting films, we prefer to deposit such electrically conducting coatings by molecular deposition such as thermal evaporation. In the carrying out of such a method the metal may be evaporated from a filament or filaments properly spaced and loaded and, as such metal is evaporated, there may be simultaneously and concurrently evaporated from another filament or filaments, properly spaced and loaded, a charge of the di-electric silicon monoxide or silicon dioxide so that the two materials are jointly and continuously deposited upon the support at the same time. When this is done and care is maintained that the two evaporations take the same time, the products will be substantially uniform in composition throughout. If we vary somewhat the rate of evaporation from the two filaments, it is obvious that a graded film may be produced in which the faster evaporating material comprises a larger ratio of the first part of the film formed and a decreasing proportion of the film as it is progressively built up, and that the result is a graded film. Of course, such gradation within a film is subject not only to the relative evaporation rates and relative filament temperatures in such a case but also is affected by the relative amounts of each material applied to the filaments.

As a means in which we may produce our layers including di-electrics comprising silicon dioxides, we may proceed by thermally evaporating in a vacuum a mixture of silicon monoxide which is relatively easy to oxidize and a metal which is relatively difficult to oxidize such as gold, and thereafter oxidizing this mixture by heating the deposit at an elevated temperature in the presence of oxygen to convert the silicon monoxide to silica.

In view of the foregoing general remarks, it is an object of the present invention to produce an electrically conducting layer which is characterized by its electrical stability, its hardness, its ability to adhere to siliceous or other support surfaces, and by the fact that the layer may be accurately controlled as to electrical resistivity both in extremely low and extremely high ranges.

It is a further object of the present invention to provide an electrically conducting layer of the character described which comprises an intimate molecular mixture of metal and an inorganic di-electric oxide of silicon.

It is a further object of the present invention to provide an electrically conducting layer of the character described in the preceding paragraph in which the mixture of metal and di-electric silicon oxide is substantially uniform throughout.

It is a further object of the present invention to provide an electrically conducting layer of the character described above in which the proportion of metal and di-electric silicon oxide is selectively varied from one surface of the layer to the other.

It is a further object of the present invention to provide an electrically conducting layer which comprises an intimate molecular mixture of metal and an inorganic di-electric silicon oxide, which is characterized by substantial thickness while having an electrical resistivity which may be in an extremely high range.

It is a further object of the present invention to provide an electrically conducting partially transparent layer comprising an intimate molecular mixture of a metal and an inorganic di-electric silicon oxide.

It is a further object of the present invention to provide an electrically conducting layer in which the electrical resistivity may be controlled as desired between extremely low and extremely high ranges which may be useful in such varied products as electrically heated windows, windshields or the like, electric goggles, electric resistance units, electrostatic dissipators, radio frequency shields, space heaters, and the like.

It is a further object of the present invention to provide an electrically conducting layer comprising a mixture of metal and inorganic di-electric silicon oxide which may be used as an intermediate graduated adhesive layer for adhering a metallic film to a support surface without producing an optical interface between the adhesive layer and the metallic film, and which may also avoid the occurrence of an optical interface provided the di-electric compound in the layer is substantially identical with the material providing the support surface.

It is a further object of the present invention to provide a novel method of producing electrically conducting layers as described in the preceding paragraphs.

It is a further object of the present invention to provide an approximately transparent electrically conducting layer useful in interference mirrors, dichroic filters and light transmissive radio frequency filters.

It is a further object of the present invention to provide a method for producing electrically conducting layers as described in the preceding paragraphs in which a metal and an inorganic di-electric silicon oxide are deposited by molecular deposition simultaneously and concurrently on a support surface.

It is a further object of the present invention to provide a method for producing electrically conducting layers of the character described in which the metal and the di-electric silicon oxide are evaporated either simultaneously and concurrently or in an overlapping timed sequence from separate filaments.

It is a further object of the present invention to provide a method for producing electrically conducting layers of the character described in which a mixture of a plurality of materials, one of which is relatively difficult to oxidize and another of which is relatively easy to oxidize, are deposited as an intimate molecular mixture on a support surface, subsequent to which the deposited layer is heated in the presence of oxygen under conditions which will produce oxidation of the material relatively easily oxidized while preventing substantial oxidation of the metal which is relatively difficult to oxidize.

Other objects and features of the invention will become apparent as the description proceeds, especially when taken in conjunction with the accompanying drawings, wherein:

Figure 8 is a diagrammatic view illustrating a windshield and showing the manner in which the electrical circuit is completed through the electrically conducting film.

Figure 9 is an enlarged fragmentary sectional view on the line 9—9, Figure 8.

Figure 10 is a sectional view through a double convex lens having an electrically conductive film applied to the opposite sides thereof so that the lens may be employed as a magnetic shutter in a polarized light system.

Figure 11 is a front elevational view of an electrically conducting film or layer applied in a definite pattern to a portion only of the surface of a support body.

Figure 1:
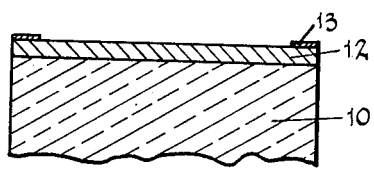
Figure 1 is a fragmentary sectional view showing a layer constructed in accordance with the present invention applied directly to a support body for example a siliceous body, such for example as glass, and having electrodes applied to the opposite ends of the electrically conducting layer.

The present invention deals with the provision of an electrically conducting film or layer comprising an intimate molecular mixture of a metal and an inorganic di-electric silicon oxide.

As the metal to be employed in forming the electrically conducting films with the di-electrics, there may be employed any solid metal which may be thermally evaporated in a vacuum. Thus, we may, for example, employ copper, gold, silver, aluminum, platinum, rhodium, nickel, iron, cobalt, tin, titanium, cadmium, zinc, chromium, manganese, palladium, magnesium, zirconium, vanadium, lead, arsenic, antimony, or bismuth. There may also be employed under special circumstances where the product is isolated in a dry atmosphere or vacuum such metals as sodium or calcium.

As the inorganic di-electric silicon oxides, there may be employed silica or otherwise silicon monoxide or mixtures of these with each other, or with other di-electric materials.

It is obvious that our electrically conducting layers might be made where more than one metal is employed in the composition, such mixed metals constituting an approximation to known alloys such as copper and nickel in a ratio similar to Monel or, for example, the nickel chromium mixture known as Nichrome. With these particular alloys one can readily secure such ratios of the metals present by directly evaporating such alloys as they distill in thermal evaporation without any substantial composition change.

Inasmuch as the electrically conducting film or layer disclosed herein is of a thickness such that it is not self-supporting and cannot be used apart from supporting structure, it will normally be applied to a supporting body, either directly to a surface of the support body or to the surface of a previously applied layer or coating. In some cases optical properties of the resulting body are significant in which case the surface of the support to which the layer is applied will be an extremely smooth surface such as a polished glass surface. Such would be the case for electrically conducting vehicle windows or optics. However, where the resulting article is to be employed by virtue only of its electrical properties, the surface need not be smooth or highly polished and excellent results have been obtained when the layer has been applied to a porous ceramic surface.

It will be appreciated that the electrical resistances given in the following examples and mentioned throughout this specification are given as ohms per square area and that such electrical resistivities are as usual, the reciprocals of electrical conductivity, thus, the lower the electrical resistance the better the electrical conductivity, and if a film has an electrical resistance of 100 ohms per square it has such a resistivity regardless of whether the square is one inch on the side or one foot on the side. In applying the products of the invention to specific applications the desirability of securing very low electrical resistance or high electrical conductivity becomes emphasized in the choice of voltage at which the electrically heated window or lens, etc., must be operated in order to provide such energy. The voltage E required to supply a given amount of energy W to a square of treated glass one square foot in area, when the current is applied to a square of glass, can be determined by the following simple formula in which R is indicated as the electrical resistance.

$$E = \sqrt{WR}$$

Furthermore, within the limits permitted by a specific application, it is of course best to maintain a window to a minimum width in one direction since by elongating in the other and attaching the electrodes along the long edges, one secures the advantages of having a number of resistances thus connected in parallel.

Lenses employed in the goggle of a helmet used in cold or freezing weather have always been subject to clouding up due to condensation and freezing of the breath upon the same, and the initial transparency of the glass is rapidly destroyed. In airplanes and other fast moving vehicles such as trains which are moving through cold strata of air, there exists a very serious problem of condensation of moisture, or under more severe conditions, actual ice formation upon the windows of the vehicle. In the case of airplanes the icing of the windows has presented a very serious problem. If heat could be applied to such surfaces during use the objectionable clouding and freezing over might be eliminated but the application of heat as such directly cannot normally be conveniently carried out. The articles prepared in accordance with this invention carry an electrically conducting coating thereon which permits the direct generation of heat in contact with the glass, light transmitting windows, or viewing lenses at all points over the surface of such glasses. In the determination of the necessary amount of heat which must be brought to a glass surface to prevent icing, for example in an airplane, it is found that a tremendous amount of heat such as between 2,000 and 4,000 British thermal units per square foot per hour must be supplied. To supply so much energy to a square foot of glass surface continuously requires a very efficient means of producing the heat directly in contact with the glass so that the heat may be carried through the glass to the front surface exposed directly to the cold atmosphere or directly developed on such front exposed surface. This large amount of heat when considered in terms of the amount of electrical energy which must be supplied, for example to a windshield four feet by one foot, runs into some 4,000 watts and from such a figure it immediately becomes apparent that for any conductor to be applied to the surface of the glass to heat the same and supply such an amount of energy, the conductor must be one of a very high degree of conductivity.

Experience has indicated that the electrical resistivity of such an electrically conducting film should be less than 100 ohms per square and at all events, not more than 150 ohms per square. At the same time experience has shown that for transparent closures suitable for a windshield and the like, a light transmission of not less than 50% is essential. In fact, it is a present requirement of windshields that they shall transmit at least 70% of normally incident light. Accordingly, in the present invention the light transparent electrically conducting film when used as a windshield is preferred to have an electrical resistivity of not more than 150 ohms per square while preserving a light transmission property of not less than 50%, and preferably of not more than 100 ohms and a relatively high light transmission of not less than 70%.

Thus in the case of an airplane it has been estimated that it is necessary to supply between 2,000 and 3,000 British thermal units per square foot per hour, or an average of 800 watts per square foot to the window to prevent icing. If 800 watts per square foot are to be generated within a glass having a resistance of 100 ohms when current is passed across a one square foot piece, the voltage required would be 283 volts. Since in moving vehicles it is highly advantageous to avoid electrical circuits which involve high voltages due to the danger inherent in accidents or particularly inherent in short circuits developing in wet weather, it becomes highly desirable that any electrically conducting glass to be used in a moving vehicle be not substantially of greater resistance than this figure, and in all events have a resistance per square of not more than 150 ohms, and in general it is desirable for the resistance per square to be at a lower value to thereby permit operation with reduced voltages. It will be obviously apparent that the requirements for heat upon an automobile or train windshield be far less than the required for an airplane, estimates ranging from 50 to 75 watts per square foot, and that consequently the articles of this invention may be employed upon such vehicles at reasonable voltages.

With a man walking in a minus 60 degrees Fahrenheit temperature with a helmet employing a partially transparent lens of the invention of three square inches, the heat demand to prevent fogging and icing has been estimated at around 1 watt per square inch. With such a lens of square shape and 1.7 inches on a side and 10 ohms resistance, a voltage of only 6 volts is necessary, which may conveniently be supplied by a small dry cell battery or hand operated generator.

Referring now to the drawings, in Figure 1 there is illustrated a support body 10 which in the present case may be a transparent or opaque body and which may be a glassy siliceous material. The electrically conducting film or layer is illustrated at 12 and is shown in this figure as applied directly to a surface of the body 10. In accordance with the foregoing disclosure the electrically conductive film or layer comprises an intimate molecular mixture of a metal and a di-electric silicon oxide. The film or layer as disclosed in this figure may be of uniform composition or variable composition. Electrodes are shown at each end of the layer as means of passing current through the film.

Figure 2:
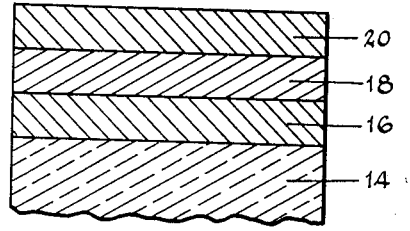
Figure 2 is a fragmentary sectional view of an electrically conducting beam splitter or dichroic mirror.

In Figure 2 there is shown a construction which is both electrically conducting and partially transparent and partially reflecting which may be employed as a beam splitter to thus separate light into two different paths. The product splits light into two strong beams by reflection and transmission with some absorption loss where the two outer layers are each approximately ¼ wave length thick as referred to visible yellow light of 5500 Angstrom units. In the Figure 14 is a transparent glass support, 16 is a layer of titanium dioxide applied thereto by thermal evaporation from a filament, and layer 18 is a successive layer applied on layer 16 by simultaneous thermal evaporation of gold and silica. Subsequently, in the same vacuum there was evaporated from a third filament titanium dioxide. The intermediate layer 18 was electrically conducting and provided the article with such properties, the conductivity being 220 ohms per square area. The layer 18 was produced more particularly as shown later in Example 3.

A modified form of the same product which has the property of selectively reflecting a high amount of blue light and selectively transmitting a high amount of the remainder of the visible spectrum or amber light is made in the same manner with the same three types of layers with the exception that each layer is made to be a quarter wave length of light with reference to 4,000 Angstrom units blue light. The product in this case is then a selective reflecting and transmitting dichroic mirror or filter which is at the same time electrically conducting and which may be used with cathode ray apparatus to prevent building up of static charges on such an optical unit.

Figure 3:
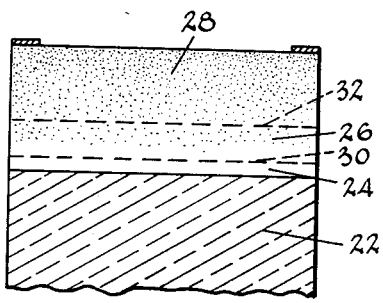
Figure 3 is a fragmentary sectional view illustrating the use of our electrically conducting layer as an intermediate layer between a di-electric layer and a metallic layer and in which suitable electrodes are shown.

In Figure 3 there is shown a variation of the present invention in which the film or layer comprising a mixture of metal and the di-electric material is disposed intermediate an adhesive layer and a layer composed of pure metal. In this figure a support body is illustrated at 22 and again may be a glass body. Upon a surface of the glass body there is deposited a relatively thin adhesive layer 24 which may be composed of a metallic compound effective to adhere strongly to glass and to provide adhesion for subsequently applied layers. On the outer surface of the adhesive layer 24 there is deposited the layer 26 which comprises an intimate mixture of metal and the inorganic di-electric silicon oxide material. Finally, there is deposited the outer layer 28 which is in this case illustrated as a layer of pure metal. The layer 26 is a graduated layer in which the portion of the layer adjacent the surface of the adhesive layer 24 is composed entirely or almost entirely of the di-electric silicon oxide material. If the di-electric silicon oxide material or mixed silicon oxides in the layer 26 is of the same optical refractive index as is characteristic of the adhesive layer 24, it will be appreciated that no optical interface exists between the layers 24 and 26 and accordingly the boundary between these layers is illustrated in the present figure as the broken line 30. The proportion of metal to di-electric silicon oxide material in the layer 26 increases progressively from the layer 24 to that portion of the layer 26 adjacent the metal film 28 and preferably, the outer portion of the intermediate film 26 is composed entirely of metal and in this case preferably of the same metal as occurs in the film 28. As a result of this there is no optical interface between the films 26 and 28 and accordingly, the boundary between these films is indicated in the figure as the broken line 32. As a result of the foregoing construction there is applied to the glass body 22 a metal film 28 which may be transparent, partially transparent, or opaque, and which has a conductivity substantially equal to the conductivity of the massive metal. At the same time the metal film 28 is adhered to the glass by means which avoids the occurrence of optical interfaces with resulting improvement in optical properties for certain purposes.

Figure 4:
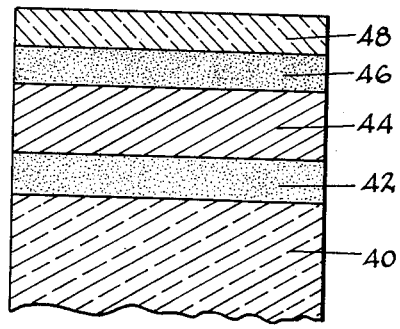
Figure 4 is a fragmentary sectional view of an electrically conducting window suitable for use in a vehicle or optic goggles.

In Figure 4 there is illustrated an article comprising a support body 40 which may be a glass body. Applied to the outer surface of the glass body 40 is a film or layer 42 which in the present instance is an intimate molecular mixture of a metal and a silicon oxide di-electric compound. In the present case this mixture may be of uniform composition throughout or it may be of a gradually varying composition. Applied to the outer surface of the layer 42 is an intermediate film 44 of metal. Applied to the outer surface of the layer 44 is a film or layer 46, again comprising an intimate molecular mixture of a metal and a di-electric of silicon oxide or oxides. In the present case an outer layer 48 is applied to the layer 46 and may comprise a layer of aluminum oxide or other metal oxides or magnesium fluoride or of pure silica. In a specific example the layers 42 and 46 each comprises an intimate molecular mixture of silica and gold as hereinafter described more particularly in the examples. The intermediate metallic layer 44 comprised gold and the outer layer 48 was pure silica. The article illustrated in Figure 4 is useful as an electrically heated windshield or the like.

Figure 5:
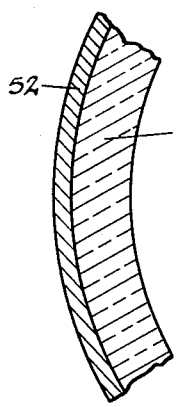
Figure 5 is a fragmentary sectional view of an electrically heated lens or goggle.

Referring now to Figure 5 there is illustrated the application of the electrically conducting film to a goggle 50, the film being indicated at 52 and applied directly to the outer convex surface of the goggle.

Figure 6:
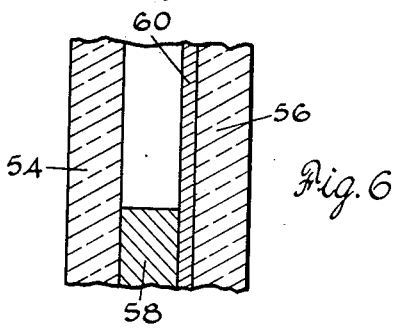
Figure 6 is a fragmentary sectional view through a double glazed window, one pane of which is provided with the electrically conducting film.

In Figure 6 there is illustrated a portion of a double glazed window comprising panes of glass 54 and 56 connected along two opposite edges by metallic spacers 58, the spacers at the other two edges being of di-electric material. The glass 56 is illustrated as having applied thereto a transparent conducting film 60 which is applied directly to the inner surface of the glass 56. The electrically conducting film 60 in the present instance is of course highly transparent and comprises an intimate molecular mixture of a metal and a silicon oxide such as silica. Electric current is applied along opposite edges of the electrically conducting film 60 by suitable contacts which may be constituted by the metal spacers 58.

Figure 7:
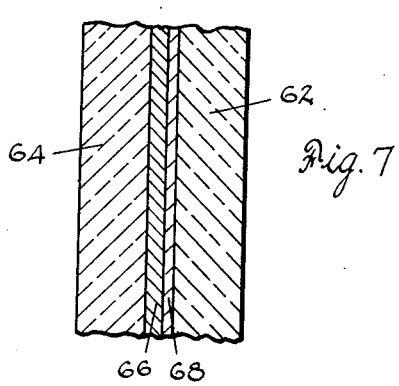
Figure 7 is a fragmentary sectional view through a laminated glass article such for example as a windshield, one ply of the glass having the electrically conducting film applied thereto.

In Figure 7 there is illustrated a windshield of the well known safety glass construction which comprises outer and inner sheets of glass indicated at 62 and 64 respectively. These sheets of glass are assembled into a sandwich with an interposed layer 66 of a suitable plastic material such for example as polyvinyl butyral or other plastic of approximately a preferred refractive index of about 1.5. By the choice of plastic of such approximate refractive index, it is found that the reflection from the coated surface is decreased upon lamination. A highly transparent electrically conducting film 68 is carried by the inner surface of the glass sheet 51 and is adhered thereto. With the parts in the relationship illustrated in this figure the windshield is designed for use with the glazed sheet 62 as the outer or forward sheet of a windshield.

Referring now to Figure 8 there is diagrammatically illustrated the manner of providing an electric circuit for a windshield. In this case elongated contacts 70 and 71 are provided along the long edges of the windshield 72, it being understood that the windshield 72 is provided with a transparent electrically conducting film of the type disclosed herein. An external source of current is indicated at 74 for connection by conductor 75 to the contacts 70 and 71, thus causing the current to traverse the metal film of the windshield.

In Figure 9 there is illustrated an enlarged section of Figure 10 showing the manner of attachment of a contact 80 to the electrically conducting film 68 which may be that illustrated in Figure 7. In this case the electrically conducting film 68 is adhered to the glass sheet 62. The glass sheet 62 is assembled with the glass sheet 64 by the intermediate ply of plastic 66 as described above. In order to provide a good contact between the contact element 80 and the electrically conducting film 68, additional metal is provided as indicated at 82. This may be done by additional thermal deposition of material along the edges of the article and it may be applied otherwise, such for example as by spraying. Such metal for contacting may also be applied in any of the present products by directly electroplating metal on the desired portions using masking protective lacquer coatings to protect the main face of the product desired to be free of such electroplated electrode areas. The electroplating current is fed directly into the first produced electrically conducting layer of the invention. The contact 80 which may be a strip of thin copper, has its edge embedded in the plastic material 66 and is retained in firm pressure contact with the metal 82 in the final assembly. The electric leads to the source of current may be applied to the contact 80 at the face of the glass.

In Figure 10 there is illustrated the application of the electrically conducting films 90 to both sides of a double convex lens 92. It will be understood that in this case the electrically conducting films are adhered directly to the surface of the glass. In this figure there is also illustrated electrical contacts 94 and 96 for supplying current to the electrically conducting coatings. It will be understood that the contacts 94 and 96 are provided in the form of arcs of circles having portions extending in area contact with peripheral portions of the electrical conducting films and that the contacts 94 and 96 are separated from each other and that the current is completed between the contacts 94 and 96 through the electrically conducting films 90.

In Figure 11 there is illustrated another application of the present invention in which the electrically conducting film is shown at 100 as applied in the form of a pattern to a support body such for example as a window pane 102. In this case the article may be useful as a burglar alarm, interruption of a current passing through the electrically conducting film 100 by breakage of the glass being effective to actuate an alarm.

The articles produced under this invention will when subjected to the adhesive tape test, successfully resist any pulling away from the glass or siliceous surface showing that there are strong bonds between the surface and the electrically conducting layer.

The articles constructed in accordance with the disclosure herein, exhibited good resistance to separation of the electrically conducting film from the support body and a surprising resistance to abrasion, and this is accomplished without in any way detracting from optical properties. Where a transparent window or optical article is desired it is preferable that the surface be smooth, and by smooth surface we use the term in its ordinary sense. It need be only sufficiently smooth to prevent visible or optical apparent light diffusion at such surface and sufficiently smooth to insure the avoidance of electrical hot spots by presenting a base upon which the electrically conducting film can be formed in a satisfactory layer. However, in many instances our invention can be formed on superficially rough ceramic bases. In the forming of articles by the present invention where the surface is smooth it is apparent that the smoothness of the surface of the support body will be reproduced in the outer surface of the electrically conducting layer. Thus, if the smooth face of the support body is polished to have an extremely smooth finish this finish will be reproduced in the interfaces or surfaces presented by the electrically conducting layer.

It is one of the advantages of the present invention that electrically conducting articles can be made upon optically required surfaces without destroying or altering such finer ground and polished faces.

Where it is desired that the electrically conducting film be both of a very high electrical conductivity and of a relatively high transparency, it is preferable that we employ gold, silver, copper, iron or nickel as the metal to provide the requisite combination of properties. It further becomes apparent that when we desire to make a window we also wish to avoid developing any reflection properties in such window, particularly as for example in an automobile windshield where action of the windshield as a mirror would be highly undesirable. Generally speaking, we have found the use of gold to give us preferred products for use in windshields, windows and optical lenses by reason of this material providing highest light transmission with the highest electrical conductivity and at the same time, the lowest light reflection properties, and further, by reason of its complete inertness to oxidation or chemical change.

It will be apparent that the desired electrical conductivity in any product may be produced by altering either the total amount of metal and total amount of dielectric, or the ratios of these two materials to each other by weight, or by altering the choice of di-electric silicon oxide and metal taken in forming the film. Thus, the thickness, the composition, and the nature of components are the controlling factors in securing the desired electrical conducting, optical, and other properties of the products of the invention. Thus, it is possible in accordance with the present invention to produce an electrically conducting film having a high or even an extremely high resistivity approaching, for example that of uncoated glass which may have substantial thickness and as a result of such thickness have substantial strength, durability, and hardness, and furthermore, as a result of such thickness being readily controllable as to the exact amount of its electrical resistance properties. Also in accordance with the present invention it now becomes possible to produce a film of any predetermined thickness and having a definite predetermined value of electrical resistance. It is thus possible to produce for example, a quarter wave length film which may have any desired electrical resistance.

*Example 1*

Into two separate filaments in a high vacuum chamber there was loaded 0.465 grams of gold in the one filament, and 0.450 grams of silica into the other filament. Each filament was located 21 inches away from a plate of transparent fused silica and the chamber was then highly evacuated. Upon the clean sheet of glass there was formed a joint deposit of two materials by heating both filaments and causing both evaporations to take place simultaneously and over the same length of time. In this case there was produced an electrically conducting transparent coating in which the coating was substantially approximately uniform in composition throughout. The reflection from the coated side was found to be 10% for ordinary visible lighting and 15% reflection from the uncoated side with a light transmission of 53%. The conductivity was found to be 2,000,000 ohms per square and the product was thus suitable as a static eliminating surface.

In this example, the amount of gold employed and the distances of evaporation were such that if the gold had been deposited as a simple layer it would have been 67 Angstrom units thick. The silica would have been about 545 Angstrom units thick. Since we do not know whether any appreciable contraction or expansion in volumes would occur when these two materials are mixed, it is not possible to say with certainty that the jointly deposited mixed composition would be as thick as the sum of these two numbers or approximately 612 Angstrom units thick. However, it would seem reasonable that the coating would be of approximately such a thickness, and in the following examples we believe such an assumption is also true and the mixed film thicknesses are thus approximately indicated. In the present example, the gold was 50.8% by weight of the mix and 11% by volume of the mixed film.

*Example 2*

In a similar vacuum chamber having two separate filaments there was loaded into one filament 0.330 grams of gold and in the second filament 0.215 grams of silica. 20 inches away from these filaments there was placed a sheet of Pyrex glass and upon it was deposited a mixed deposit by evaporating from both filaments throughout the same space of time. This deposit again was approximately uniform throughout and the product showed a reflection value from the coated side of 19%, a reflection from the uncoated side of 12%, a light transmission of 56%, and an electrical conductivity of 750,000 ohms. This particular plate was useful as a radar plotting screen which provided suitable optical properties and was static eliminating.

The gold in this example was 60.5% by weight and 16.9% by volume of the deposited coating. The gold would have supplied a thickness of 53 Angtsrom units and the silica would have given a coating of 261 Angstrom units or a total film thickness of the order of 314 Angstrom units.

*Example 3*

In a high vacuum chamber there was thermally evaporated from two filaments simultaneously, gold and silica. In the one filament there was loaded 0.330 grams of gold, and in the other filament 0.115 grams of silica. These were placed 21 inches away from a plate of commercial polished plate glass. The deposit on the silica plate showed the properties of 5½% reflection from the coated side, 15% reflection from the uncoated side, 60% light transmission, and 220 ohms per square of electrical resistance. The product was suitable as an electrically heated window.

In this example, the gold was 74.5% by weight and 25.7% by volume of the coating and the metal supplied a thickness of 48 Angstrom units and the silica a thickness of 139 Angstrom units.

*Example 4*

In a vacuum chamber there was evaporated separately from two filaments 21 inches away from a clear glass plate, 0.180 grams of silver and 0.035 grams of silica. These evaporations were carried out simultaneously over the same length of time and the product should have been a substantially uniform mix throughout. The coating produced showed a reflection from the coated side of 17%, a reflection from the uncoated side of 7%, and a light transmission of 56%. The electrical resistance was 800 ohms per square.

The silver was 83.7% of the total weight and 53.4% of the volume of the mixed film and the metal supplied a thickness of 48 Angstrom units and the silica a thickness of 42 Angstrom units with the total of 90 such units.

*Example 5*

In a similar manner there was evaporated by thermal evaporation in a vacuum copper and silica simultaneously from two separate filaments over the same length of time. From the one filament there was evaporated 0.135 grams of copper and from the other filament there was evaporated 0.035 grams of silica. The product showed a reflection from the coated side of 13%, a reflection from the uncoated side of 5%, and a light transmission of 64%. The electrical resistance value of the product was 180 ohms per square.

The copper in this example was 79.4% of the total weight and 50% of the total volume of the deposited film in which the copper provided a thickness of 42 Angstrom units and the silica a thickness of 42 Angstrom units.

*Example 6*

In a high vacuum chamber there was loaded into a single filament a mixture comprising 20% nickel by weight and the remainder being silicon monoxide. The actual weight of nickel employed was 0.0325 grams and the weight of silicon monoxide was 0.130 grams. At a distance of 13", 17" and 21" away from the filament, there was placed three pieces of clean glass upon which the evaporated materials were formed as deposits. Also at 21" away from the filament there was placed a piece of glazed porcelain. After the high vacuum had been established and the materials had been evaporated, it was found that the coated pieces, when measured, had the following properties. The piece which had been at 13" from the filament showed an electrical resistance of 6 megohms or 6 million ohms. It also had a light transmission of 65% and a reflectivity from the coated side of 20%. The reflectivity when measured through the glass was 13%. The piece located 17" from the filament had a somewhat thinner coating and showed an electrical resistance of 35 megohms, a light transmission of 77%, a reflectivity on the coated side of 16% and a reflectivity measured through the glass of 10%. The glass piece and the porcelain piece located at 21" showed 180 megohms electrical resistance per square. The glass piece showed a light transmission of 83%, a reflectivity from the coated side of 12%, and a reflectivity measured through the glass of 9%. Obviously, these materials could be used to eliminate static electricity and were suitable in the case of the glass coated pieces as transparent working tables which might have been used in connection with radar plotting or in connection with other purposes where light transmission and freedom from development of static electricity were both desirable.

Examples 7, 8 and 9

From two filaments there was evaporated in a high vacuum chamber upon glasses placed at 21½", 20" and 14¼" away from the filaments, 0.035 grams of silicon dioxide from one filament and from the other filament 0.135 grams of gold. Upon the glass nearest to the filament there was produced a coating having an electrical conductivity of 22 ohms per square and a light transmission of 57%. From the coated side this product showed a reflectivity of 20% and through the glass a reflectivity of 18%. The piece of glass coated at 20" away from the filaments showed an electrical conductivity of 100 ohms per square and a light transmission of 62%. It had a reflectivity which was not much different from that of uncoated glass, namely 14% on the coated side and through the glass a reflectivity of only 5%. This particular product could be satisfactorily used as an electrically heated windshield for airplane use. The glass which was farthest away from the filaments received a deposit thereon which showed an electrical conductivity of 180 ohms per square and a light transmission of 64%. From the coated side the reflectivity was 13% while measured through the glass the reflectivity was 5%.

The gold in these examples was 79.5% of the total weight and 31.5% of the volume of the deposits. In the thinnest film which was deposited on the glass at 21.5 inches, the metal provided a thickness of 19 Angstrom units and the silica a thickness of 40 such units. In the thickest film which was deposited on the closest glass, the metal provided a thickness of 41 Angstrom units and the silica a thickness of 89 Angstrom units.

Examples 10, 11 and 12

From a single filament in a high vacuum chamber there was evaporated a mixture of 0.070 grams of chromium and 0.130 grams of silicon dioxide. The deposit was formed upon plates of glass placed at 13", 17" and 21" away from the filament and it was a graded deposit. Upon the nearest glass there was formed a coating having an electrical conductivity of 3000 ohms per square, a light transmission of 36%, a reflectivity from the coated side of 23%, and a reflectivity measured through the glass of 23%. The glass located at 17" was found to have a deposit which showed an electrical conductivity of 3750 ohms, a light transmission of 42%, and a reflectivity from the coated side of 24%, with a reflectivity measured through the glass of 16%. The glass coated at 21" away from the filament showed an electrical conductivity of 5000 ohms, a light transmission of 53%, a reflectivity from the coated side of 19%, and a reflectivity measured through the glass of 10%. This last sample could be employed as a coating on an ordinary fluorescent electric light tube as a filter thereon which would permit the light to come through but which would at the same time prevent radio frequency waves generated by such lights from coming through the lamp bulb. Thus, such a coated lamp bulb could be employed around electronic and other electrical instruments such as radar and radio compass equipment without interfering with the operation of such equipment, while permitting the visual light for the use of the operators.

The drawings and the foregoing specification constitute a description of the improved electrically conducting coated glass or ceramic articles suitable for use as a lens, a window or a windshield, or the like, in such full, clear, concise and exact terms as to enable any person skilled in the art to practice the invention, the scope of which is indicated by the appended claims.

The chromium was 35% by weight and 15.2% by volume of the mixed deposits. In the thickest film the chromium provided a thickness of 74 Angstrom units and the silica a thickness of 412 Angstrom units. In the thinnest film the metal thickness provided was 28 Angstrom units and the silica was such as to provide 158 Angstrom units.

We claim:

1. The method of producing an electrically conductive article which comprises concurrently depositing by thermal evaporation upon a surface of a body of siliceous material placed within a vacuum an intimate molecular mixture of metal and a dielectric comprising an oxide of silicon.

2. The method as defined in claim 1, which comprises effecting evaporation of the metal and di-electric at relatively variable rates to produce a layer in which the proportion of metal to di-electric is variable.

3. The method as defined in claim 1, which comprises effecting evaporation of the metal and di-electric at relatively variable rates and in an overlapping timed sequence to produce a composite layer including a stratum composed essentially of one of said metal and di-electric.

4. The method as defined in claim 1, in which the di-electric is silica.

5. The method as defined in claim 1, in which the di-electric is silicon monoxide.

6. The method as defined in claim 1, in which the di-electric is a mixture of silica and silicon monoxide.

7. The method as defined in claim 1, in which the di-electric as deposited comprises silicon monoxide, and thereafter oxidizing the silicon monoxide to silica.

8. An electrically conductive article comprising: a body of transparent glassy siliceous material having a smooth continuous surface; a continuous transparent layer deposited by molecular deposition carried by said body, said layer composed of an intimate molecular mixture of metal and a di-electric consisting of one or more oxides of silicon, in which both the metal and the di-electric are present in the layer essentially as dispersed molecular particles, the layer being substantially uniform in thickness, the proportion of metal to the oxide of silicon in such layer and the thickness of said layer being such that said layer has a light transmission of at least 50% with the outer surface of said layer being susbtantially smooth.

9. An article as defined in claim 8 in which the proportion of metal to di-electric is constant throughout the layer.

10. An article as defined in claim 8 in which the proportion of metal to di-electric is variable throughout the layer.

11. An article as defined in claim 10 in which the proportion of metal varies progressively from 0% to 100% from one surface of said layer to its other surface.

12. An article as defined in claim 8 in which said layer is applied directly to a surface of said body.

13. An article as defined in claim 8 in which the said layer is an intermediate one of a pluarlity of layers applied to a surface of said body.

14. An article as defined in claim 8 in which said article comprises a second layer composed of the same di-electric as occurs in said first-mentioned layer, and a third layer composed of the same metal as ocurs in said first-mentioned layer, said second and third layers contacting opposite surfaces of said first-mentioned layer, the proportion of metal to di-electric in said first-mentioned layer varying progressively from 0% at the surface of said first-mentioned layer in contact with said second layer to 100% at the surface of said first-mentioned layer in contact with said third layer.

15. An article as defined in claim 8 in which said di-electric is silica.

16. An article as defined in claim 10 in which said di-electric is silicon monoxide.

17. An article as defined in claim 8 in which said di-electric is a mixture of silicon dioxide and silicon monoxide.

18. An article as defined in claim 8 in which said metal is gold.

19. An article as defined in claim 8 in which said metal is silver.

20. An article as defined in claim 8 in which said metal is copper.

21. An article as defined in claim 8 in which said metal is nickel.

22. An article as defined in claim 8 in which said metal is chromium.

23. The method of producing an electrically conductive article, which comprises concurrently and at uniform rates thermally evaporating upon a surface of a body of siliceous material placed within a vacuum an intimate molecular mixture of metal and dielectric comprising an oxide of silicon such that a layer is produced in which the proportion of metal to dielectric is constant.

References Cited in the file of this patent

UNITED STATES PATENTS

| | | |
|---|---|---|
| 1,922,221 | Steenbeck et al. | Aug. 15, 1933 |
| 2,442,976 | Heany | June 8, 1948 |
| 2,461,878 | Christensen et al. | Feb. 15, 1949 |
| 2,614,944 | Lytle | Oct. 21, 1952 |
| 2,628,929 | Colbert et al. | Feb. 17, 1953 |

FOREIGN PATENTS

| | | |
|---|---|---|
| 387,150 | Great Britain | Feb. 2, 1933 |
| 428,820 | Great Britain | May 20, 1935 |
| 502,273 | Great Britain | Mar. 15, 1939 |
| 606,894 | Great Britain | Aug. 23, 1948 |